United States Patent [19]
Hori et al.

[11] Patent Number: 5,813,733
[45] Date of Patent: Sep. 29, 1998

[54] METAL CORE MEMBER FOR RUBBER CRAWLER BELT, THE RUBBER CRAWLER BELT AND METHOD OF WINDING THE SAME

[75] Inventors: Kazutoshi Hori; Ryuichi Saiga, both of Osaka, Japan

[73] Assignee: Komatsu Ltd., Tokyo, Japan

[21] Appl. No.: 737,254

[22] PCT Filed: Apr. 24, 1995

[86] PCT No.: PCT/JP95/00803

§ 371 Date: Oct. 28, 1996

§ 102(e) Date: Oct. 28, 1996

[87] PCT Pub. No.: WO95/29088

PCT Pub. Date: Nov. 2, 1995

[30] Foreign Application Priority Data

Apr. 26, 1994 [JP] Japan .................................. 6-112027

[51] Int. Cl.⁶ ............................................... B62D 55/24
[52] U.S. Cl. ........................................... 305/172; 305/174
[58] Field of Search .................................. 305/157, 165, 305/167, 171, 172, 173, 174, 177

[56] References Cited

U.S. PATENT DOCUMENTS 5,308,155  5/1994  Katoh .................................. 305/171 X
5,380,076  1/1995  Hori .................................... 305/177 X
5,399,033  3/1995  Katoh ...................................... 305/171

FOREIGN PATENT DOCUMENTS

| 55-135679 | 9/1980 | Japan . | |
| 1266080 | 10/1989 | Japan | 305/174 |
| 2-110592 | 9/1990 | Japan . | |
| 3070687 | 3/1991 | Japan | 305/173 |
| 3-220071 | 9/1991 | Japan . | |
| 4191183 | 7/1992 | Japan | 305/174 |
| 5-58353 | 3/1993 | Japan . | |
| 5-162666 | 6/1993 | Japan . | |
| 5-86775 | 11/1993 | Japan . | |
| 91/12165 | 2/1991 | WIPO . | |

*Primary Examiner*—Russell D. Stormer
*Attorney, Agent, or Firm*—Sidley & Austin

[57] ABSTRACT

The present invention is a metal core member for a rubber crawler belt, the rubber crawler belt, and a method of winding the same, and can prevent fall-off of the crawler belt, resulting from a flange portion of an idler wheel running on a rail surface of the metal core member. For this purpose, the metal core members (10, 20), which are buried equidistantly in the rubber crawler belt (5), are equipped with guide slopes for facilitating entry of the flange portion (4a) of the idler wheel at the time of a vehicle reversing, on the inner side surfaces of a pair of protuberances (13, 14, 23, 24) provided at the central portion of the rubber crawler belt (5) in its transverse direction. The slope angle ($\theta$) of the guide slopes is in the range of 5° to 15°, and the length ($L_R$) of the guide slope is preferably as great as possible.

36 Claims, 6 Drawing Sheets

METAL CORE MEMBER FOR RUBBER CRAWLER BELT, THE RUBBER CRAWLER BELT AND METHOD OF WINDING THE SAME

TECHNICAL FIELD

The present invention relates to a metal core member for a rubber crawler belt, the rubber crawler belt, and a method of winding the same; and more particularly, relates to a metal core member for a rubber crawler belt, the rubber crawler belt, and a method of winding the same, which are applicable to various kinds of crawler vehicles, including construction machinery such as bulldozers, hydraulic shovels, etc.

BACKGROUND ART

Conventionally, in various kinds of crawler vehicles, including construction machinery such as bulldozers, hydraulic shovels, etc., the upper rolling wheels and the lower rolling wheels have been attached to the upper and lower parts of the track frame, which are provided between an idler wheel and a driving wheel; and a crawler belt made of metal has been wound around each of the above-described wheels so as to surround them. In the conventional crawler belt, iron links are connected by link pins so as to be endless, with a crawler plate being attached to each link, and the power which is transmitted to the above-described driving wheel rotates the crawler belt to drive the vehicle. In recent years, there have been increasing occasions to bring the crawler vehicles into operation on city streets; and, therefore, from the viewpoint of the reduction of noise and vibration caused when the vehicles are driven, the prevention of damage to the pavements, the maintenance of the health of the operators, the extension of the useful working life of the crawler vehicles, etc., an integral type of crawler belt, wherein metal core members are buried at specified intervals in a rubber belt having a loop form, has been widely used instead of the above-described metal crawler belt, and the teeth of a driving wheel are meshed with the metal core members to drive the vehicle.

Figure 4:
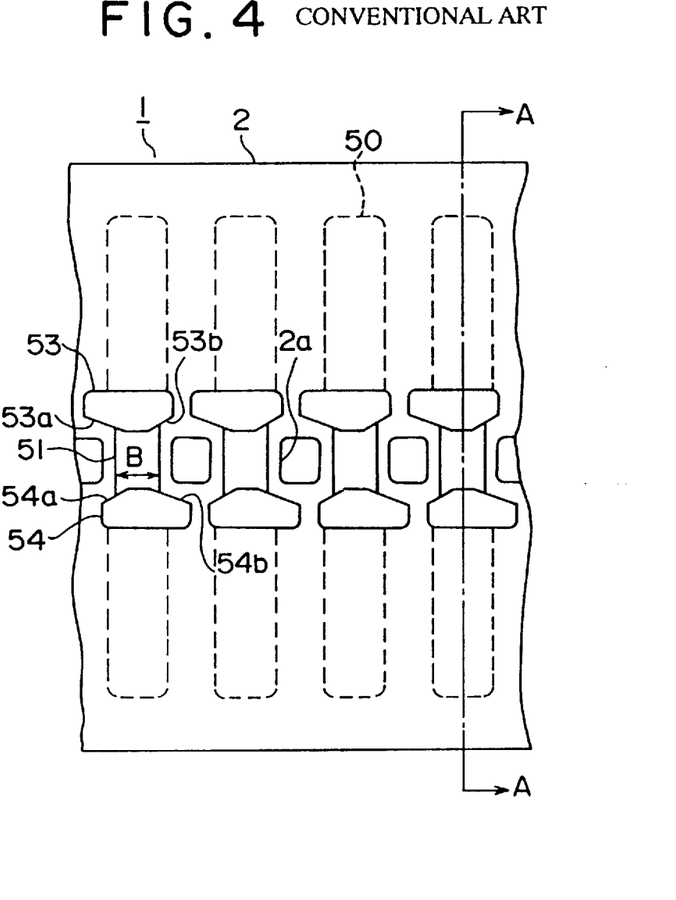
FIG. 4 is a partial plan view showing an example of a rubber crawler belt relating to the conventional art and showing the rubber crawler belt, seen from the interior perimeter side.
Figure 5:
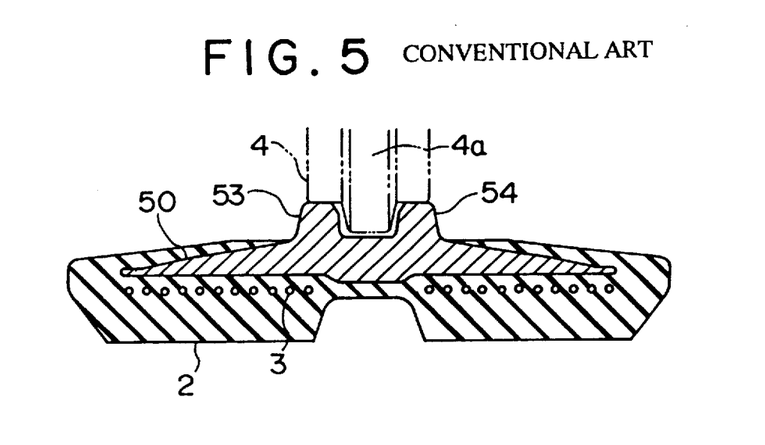
FIG. 5 is a cross-sectional view along line A—A of FIG. 4.

In FIGS. 4 and 5, showing one example of the conventional rubber crawler belts, a rubber crawler belt 1 is defined by a rubber member of a loop form (an elastic endless belt) 2, a plurality of metal core members 50, formed of a metal and buried transversely to the rubber member 2 at specified longitudinal intervals along the rubber member 2, and a plurality of core wires 3, formed of a metal and buried longitudinally along these metal core members so as to surround the outside of these metal core members. Each above-described metal core member 50 includes an engaging portion 51 having a fore-and-aft length of B, which is shorter than the interval between the teeth of the driving wheel, and a central portion having a substantially half-round shape in its transverse direction. An idler wheel 4 and the upper and lower rolling wheels rotatively move on the top surfaces of a pair of rails 53 and 54, projectingly provided at the right and left ends of this engaging portion 51.

On the surface of the external perimeter of the above-described rubber member 2, lugs are formed in a specified pattern. An engaging hole 2a, for engaging with the driving wheel, is provided between the adjacent metal core members at the central portion of this rubber member 2 in its transverse direction, and when the engaging portion 51 of the metal core member 50 is engaged with the tooth of the driving wheel, the above-described engaging hole 2a lets the tooth of the driving wheel escape. The core wires 3 are buried in the rubber member 2 in order to secure the tensile strength of the rubber crawler belt 1 and to improve the rigidity of the same.

Figure 6:
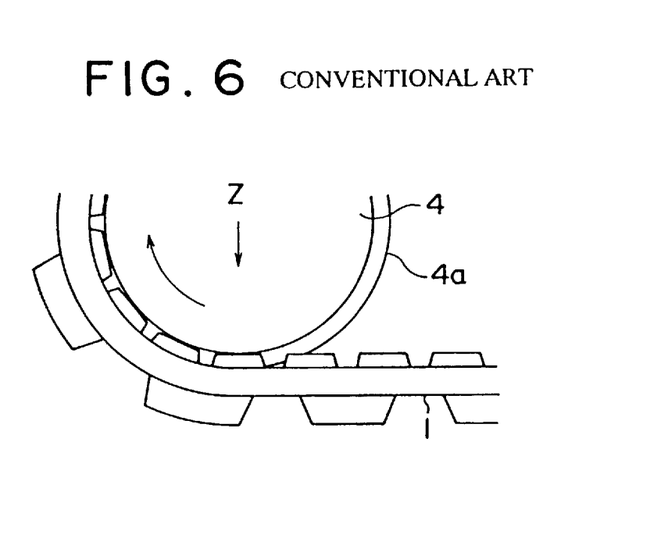
FIG. 6 is a partial explanatory view showing the state in which the rubber crawler belt relating to the conventional art winds on an idler wheel.

The rubber crawler belt 1 winds on the idler wheel 4 at the front portion of the vehicle as shown in FIG. 6. At the central portion of the idler wheel 4 in its transverse direction, that is, at the portion between the right and left rotating circumferential surfaces, a flange portion 4a, projecting more than the above-described rotating surfaces, is provided; and the above-described flange portion 4a passes between a pair of rails 53 and 54, as shown in FIG. 5. At both ends of the opposing inner side surfaces of the abovedescribed pair of rails 53 and 54, guide slopes 53a, 53b, 54a, and 54b are respectively provided in order that the flange portion 4a of the idler wheel 4 slides smoothly into the space between the rails 53 and 54. It should be mentioned that the above-described engaging portion 51, and the rails 53 and 54 are exposed above the internal perimeter surface of the above-described rubber member 2.

Figure 7:
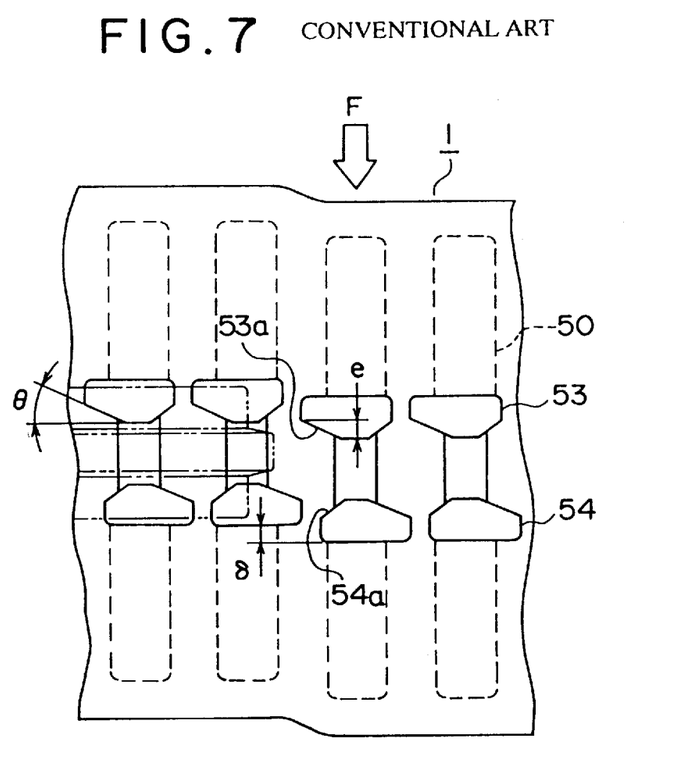
FIG. 7 is a view of FIG. 6 seen from the arrow Z.

In a crawler vehicle having the rubber crawler belt 1 of the above-described structure wound thereon, the rubber crawler belt sometimes falls off the idler wheel 4 when the steering operation is conducted while traveling, or when the vehicle is running on a slope slanting to the right or slanting to the left. In most cases, such fall-off of a crawler belt occurs when a crawler vehicle reverses. For example, when the vehicle tries to turn while reversing, a thrust load F from a direction perpendicular to the longitudinal direction of the rubber crawler belt 1 acts on the crawler belt portion which is about to wind on the idler wheel 4, as shown in FIG. 7, so that the rubber crawler belt 1 becomes deformed. As the core wires 3 (refer to FIG. 5) are buried in the rubber crawler belt 1, the rubber crawler belt 1 can sufficiently endure the load in a direction of the tensile force; however, the rubber crawler belt 1 cannot endure the above-described load in a transverse direction, so that the displacement 6 occurs between some of the metal core members 50.

Thus, considering the length in a transverse direction of the guide slopes 53a and 54a of the rails 53 and 54 of the metal core member 50 to be e:

(1) when δ<e, the flange portion 4a of the idler wheel 4 slides on the above-described guide slope 53a or 54a and fits into the portion between the opposing rails 53 and 54.

(2) when δ>e, the flange portion 4a of the idler wheel 4 runs on the rail 53 or on the rail 54, so that the rubber crawler belt 1 falls off the idler wheel 4, and the vehicle cannot run. When the fall-off of the crawler belt 1 repeatedly occurs, the operational efficiency is seriously impaired and damage, such as a crack, breakaway, etc., is caused.

Accordingly, in the conventional art, the displacement δ is designed to be as small as possible, and the length in a transverse direction e is designed to be as great as possible. More specifically, in order to make δ as small as possible, a bias cord is buried in the rubber member (for example, refer to Japanese Utility Model Application Laid-open No. 2-110592, and Japanese Patent Application Laid-open No. 3-220071), and a stopper is made by providing a projection projecting in a longitudinal direction of the rubber crawler belt (for example, refer to Japanese Patent Application Laid-open No. 5-58353, and Japanese Utility model Application Laid-open No. 5-86775). In order to make the length e in a transverse direction of the guide slope as great as possible, the angle θ of the guide slope with respect to the longitudinal direction of the crawler belt is made to be large. However, the limit of the above-described angle θ is 45° and the angle θ is normally set at a value in the range of 20° to 30°.

Figure 8:
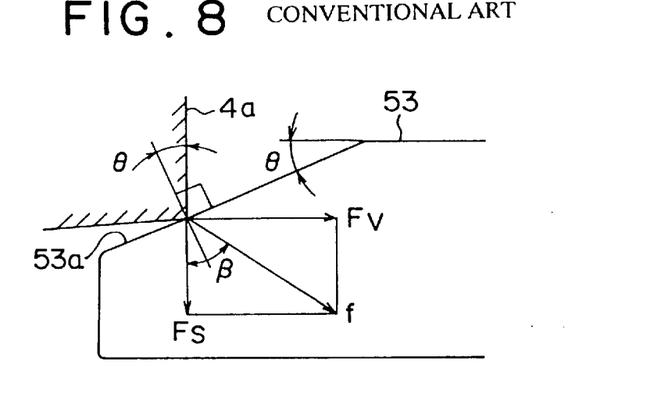
FIG. 8 is an enlarged view of a rail portion of a metal core member of FIG. 7.
Figure 9A:
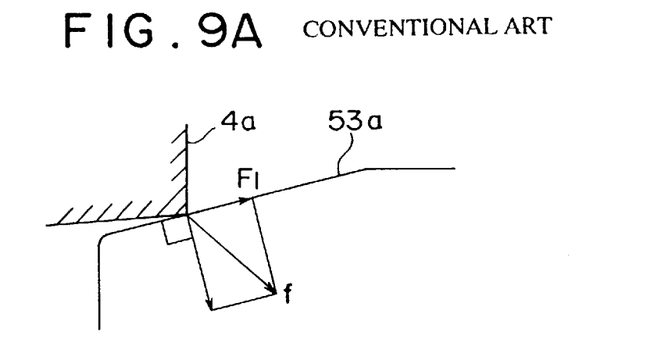
Figure 9B:
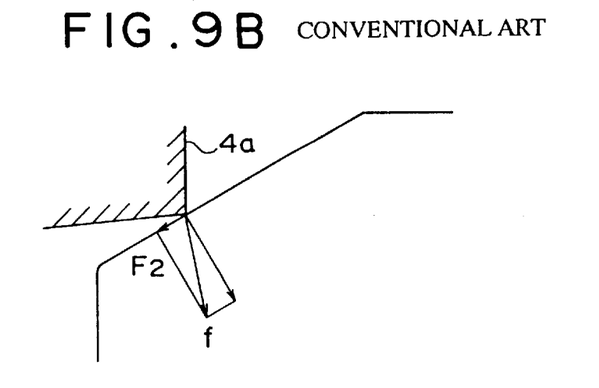
FIG. 9B is an explanatory view showing the condition for the flange portion of the idler wheel to ride on the rail surface.

In FIG. 8, when the pulling force of the crawler belt is $F_V$, the thrust force acting on the crawler belt is $F_S$, the resultant force of the above-described $F_V$ and $F_S$ is f, the angle made by $F_S$ and f is β, the friction coefficient between the metal core member and the flange portion of the idler wheel is μ, and $β=\tan(F_V/F_S)$. The necessary condition for the flange portion 4a of the idler wheel to slide on the guide slope 53a of the rail 53 and to fit into the central portion of the metal core member is $β-θ>\tan^{-1}μ$. As shown in FIG. 9A, when a component of the force $F_1$ is larger than the friction force between the metal core member and the flange portion 4a of the idler wheel, the flange portion 4a of the idler wheel slides on the guide slope 53a. On the other hand, as shown in FIG. 9B, when a component of the force $F_2$ is smaller than the friction force between the metal core member and the flange portion of the idler wheel, the flange portion 4a of the idler wheel runs on the rail instead of sliding on the guide slope 53a.

Accordingly, as in the conventional art, in the case that the angle θ of the guide slope in the metal core member is set in the range of 20° to 30°, when the thrust force $F_S$ acting on the crawler belt increases, or when the pulling force $F_V$ of the crawler belt decreases, the angle β in either case becomes small and the flange portion of the idler wheel does not slide on the guide slope, so that fall-off of the crawler belt frequently occurs.

Figure 10A:
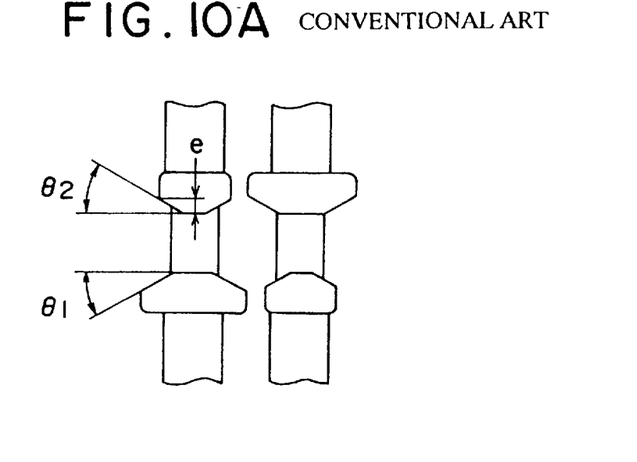
Figure 10B:
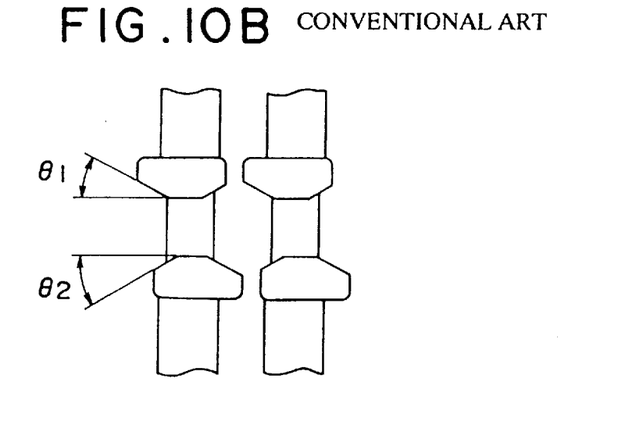
FIG. 10B is a view of two metal core members with each pair of rails being offset in the opposite direction to each other.
Figure 10C:
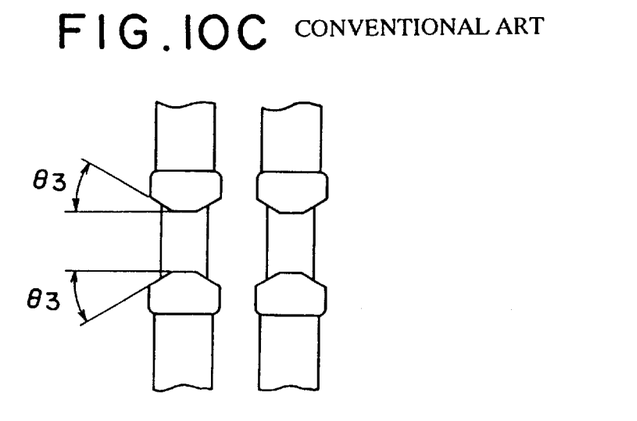
FIG. 10C is a view of two metal core members with each pair of rails having the same length.

In the conventional art, as shown in FIG. 10A to FIG. 10C, the angle of the guide slope of only one rail out of a pair of rails can be made to be small. The metal core member in FIG. 10A has a pair of long and short rails projectingly formed in the central portion of the metal core member and the above-described rails are buried in the rubber member so that the long and short rails are alternately positioned to construct the rubber crawler belt. In this construction, the slope angle θ1 of the rail with a longer guide slope can be made to be small, but the slope angle θ2 of the rail with a shorter guide slope becomes larger than θ1, so that fall-off of the crawler belt is caused when the flange portion of the idler wheel abuts on the slope angle θ2.

The metal core member in FIG. 10B is constructed in such a way as a pair of right and left rails projectingly formed in the central portion of the metal core member are offset in opposite directions to each other along the longitudinal direction of the rubber crawler belt. In this case as well as in FIG. 10A, the slope angle θ2 of the rail with a shorter guide slope becomes larger than the slope angle θ1 of the rail with a longer guide slope.

Generally, in many cases, the slope angles of the guide slopes of a pair of right and left rails are constructed to be the same slope angle θ3. As for the reasons, the following two points are cited.

(1) As for the guide slope of the metal core member, the emphasis has been put on increasing the length e in a transverse direction of the guide slope in the rail, instead of seeing from the view that the flange portion of the idler wheel fits into the portion between the rails as it is sliding on the guide slope.

(2) When the crawler belt winds on the idler wheel, or driving wheel, the ends of the rails of the adjacent metal core members easily interfere with each other, and the lengths of the rails in the longitudinal direction of the crawler belt are limited in order to prevent this interference.

Accordingly, in order that the length e of the guide slope in the rail of the above-described metal core member is secured, there is no way other than to increase the slope angle θ of the guide slope of the rail, so that fall-off of the crawler belt is easily caused.

In the above-described Japanese Patent Application Laid-open No. 5-58353, a stopper, projecting in the longitudinal direction of the crawler belt, is provided in the metal core member, and by holding the stopper of one of a pair of the metal core members which are adjacent to each other, with the stopper of the other metal core member, the transverse deformation of the rubber crawler belt, occurring when the crawler vehicle turns while reversing, is prevented. Though by the above-described stopper, the deformation in the transverse direction of the rubber crawler belt can be prevented to some extent, there is a disadvantage in that the above-described deformation cannot be completely prevented since there is a gap between the stoppers.

SUMMARY OF THE INVENTION

Mitigating the fact that the frequent fall-off of the crawler belt from the idler wheel when the crawler vehicle turns while reversing results from the form of the rail provided at the metal core member, the present invention is made, and its object is to provide a metal core member for a rubber crawler belt, the crawler belt, and a method of winding the same which can prevent a flange portion of an idler wheel from running on a rail surface of a metal core member.

A metal core member for a rubber crawler belt of the first aspect of the present invention, wherein a plurality of metal core members are aligned and buried equidistantly in regular order in a longitudinal direction of the inside of the elastic endless belt, includes a pair of right and left rails which have a specified height from the interior perimeter surface of the elastic endless belt to the inner side, and which are positioned in series form in the longitudinal direction of the elastic endless belt, with the top surfaces of the rails being surfaces for rotating wheels to rotate on, and is characterized by the pair of right and left rails being a pair of right and left protuberances, by the guide slopes for facilitating entry of a flange portion projecting from a rotating surface of an idler wheel being provided at both ends of the opposing inner side surfaces of the above-described pair of protuberances, and by the length of the guide slope at one end of the opposing inner side surfaces being constructed to be longer than that at the other end, with the guide slopes at one end being constructed to be aligned in the same direction.

In the metal core member for a rubber crawler belt in the second aspect of the invention, a slope angle of the guide slopes provided at one end in the first aspect of the invention to the longitudinal direction of the rubber crawler belt can be in the range of 5° to 15°.

In the metal core member for a rubber crawler belt in the third aspect of the invention, the pair of right and left protuberances can be positioned by being displaced fore-or-aft relative to the centerline of the metal core member in the longitudinal direction of the metal core member in the first or the second aspect of the invention.

In the metal core member for a rubber crawler belt in the fourth aspect of the invention, the metal core member for a rubber crawler belt is that of the third aspect of the invention, and at the projecting portion of the protuberance displaced and projected in a transverse direction of the metal core member, a first stopper member can be provided, while in the transverse direction of the rubber crawler belt, a second stopper member can be provided in parallel with the protuberance at a specified intervals.

In the metal core member for the rubber crawler belt of the fifth aspect of the invention, the metal core member for the rubber crawler belt is that of the third aspect of the invention, and at the opposite side in a fore-and-aft direction to the projecting portion of the protuberance which is displaced and projected in the transverse direction of the metal core member, a third stopper member can be provided adjacently to the protuberance.

In the rubber crawler belt of the sixth aspect of the invention, metal core members for a rubber crawler belt of any one of the first to third aspects of the invention are equidistantly aligned and buried in the longitudinal direction of the inside of an elastic endless belt so that the above-described pair of protuberances have a specified height from the interior perimeter surface of the elastic endless belt to the inner side and are in series form in the longitudinal direction of the elastic endless belt with the top surfaces of the protuberances made to be the surfaces for the rotating wheels to rotate on.

In the rubber crawler belt of the seventh aspect of the invention, the metal core members for a rubber crawler belt of the fourth and fifth aspects of the invention are equidistantly aligned and buried in the longitudinal direction of the inside of the elastic endless belt so that the above-described pair of protuberances have a specified height from the interior perimeter surface of the elastic endless belt to the inner side and are in series form in the longitudinal direction of the elastic endless belt with the top surfaces of the protuberances made to be the surfaces for rotating wheels to rotate, and a stopper member can be placed in a specified portion spaced between the first stopper member and the second stopper member.

In the method of winding a rubber crawler belt in the eighth aspect of the invention, the rubber crawler belt of the sixth aspect or the seventh aspect of the invention is wound in such a way that the above-described guide slope provided at one end faces the direction in which the flange portion of the idler wheel enters when the vehicle reverses.

By the structure of these first to eighth aspects of the invention, with the length of the rails (protuberances) being limited in the metal core member for a rubber crawler belt, the length of the guide slopes provided on the inner side surfaces of the above-described rails need to be as long as possible to the side from which the flange portion of the idler wheel enters when the vehicle reverses, while the slope angle of the guide slope needs to be 15° or less. Accordingly, guide slopes which facilitate entry of the flange portion, projecting from the rotating circumferential surface of the rolling wheel, are formed on the opposing inner side surfaces of a pair of rails provided at the central portion of the metal core member in its transverse direction, and the slope angle of the above-described guide slope to the longitudinal direction of the rubber crawler belt is made to be in the range of 5° to 15° at the side from which the flange portion of the idler wheel enters when the vehicle reverses. As for the length of the guide slope along the longitudinal direction of the rubber crawler belt, the length of the side, from which the flange portion of the idler wheel enters when the vehicle reverses, is made to be longer than the length of the side from which the flange portion of the idler wheel enters when the vehicle moves forward.

As a result, when the flange portion of the idler wheel abuts on the guide slope, the component of a force F1 along the guide slope becomes greater than the friction force between the metal core member and the flange portion of the idler wheel as shown in the above-described FIG. 9A, so that the flange portion of the idler wheel can slide on the guide slope and enter the portion between the rails. Accordingly, when the rubber crawler belt of the present invention is wound, the flange portion of the idler wheel does not run on the rail surfaces for rotation, so that the crawler belt does not fall off even if the vehicle turns while reversing or runs on a slope.

BRIEF DESCRIPTION OF THE DRAWINGS

FIG. 9A and FIG. 9B are enlarged views of a rail portion of a metal core member of FIG. 7, with FIG. 9A being an explanatory view showing the condition for the flange portion of the idler wheel to slide on the guide slope, while FIG. 10A to FIG. 10C are explanatory views of the slope angle θ of the guide slope provided on the inner side of the rail, with FIG. 10A being a view of two metal core members having a pair of right and left rails of different lengths, while

BEST MODE FOR CARRYING OUT THE INVENTION

A preferable embodiment of the metal core member for a rubber crawler belt, the rubber crawler belt, and the method of winding the same will be particularly described below with reference to the attached drawings.

Figure 1:
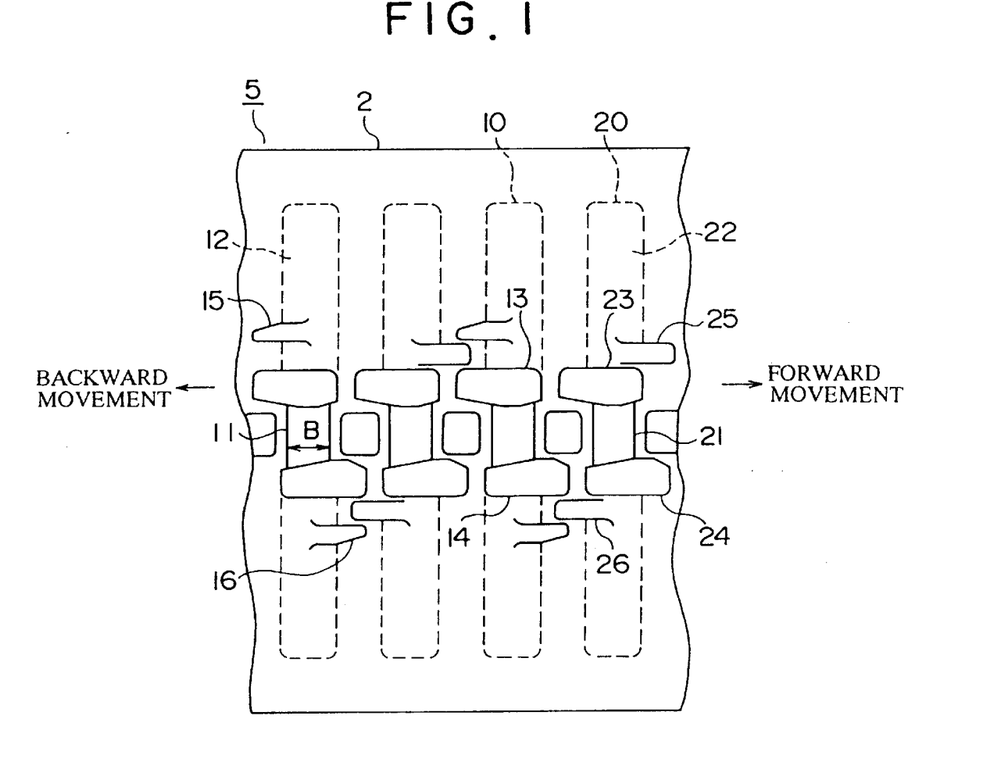
FIG. 1 is a partial plan view of a rubber crawler belt relating to the first embodiment of the present invention, seen from the interior perimeter side.

The first embodiment will be described with reference to FIGS. 1 and 2. It should be mentioned that in FIG. 1, "forward" or "backward" corresponds to the direction in which the lower section of the rubber crawler belt 5 moves in each case when the crawler vehicle moves forwardly or rearwardly. A rubber crawler belt 5 is constructed by burying metal core members 10 and metal core members 20 alternately in a rubber member (elastic endless belt) 2 at equal intervals along the length of the rubber member 2. In its central portion in the transverse direction, the above-described metal core member 10 includes an engaging portion 11, which is in a substantially half-round form with a length B in a fore-and-aft direction which is shorter than the interval between adjacent teeth of a driving wheel; and the wing portions 12 are formed at both sides of the engaging portion 11. At the connections of the wing portions 12 to the above-described engaging portion 11, a pair of rails (protuberances) 13 and 14 are provided so as to project upwardly and become the surfaces for rotation of an idler wheel and upper and lower rolling wheels. The above-described rails 13 and 14 (first stopper members) are offset from each other in the longitudinal direction of the rubber crawler belt 5 in that they project longitudinally from the engaging portion 11 in opposite longitudinal directions; and stoppers (second stopper members) 15 and 16 are located outside the rails 13 and 14, respectively, and project in the offset direction of the respective adjacent one of the rails 13 and 14.

Like the metal core member 10, the metal core member 20 includes an engaging portion 21 in its central portion in the transverse direction, and wing portions 22 are formed at both sides thereof.

At the connections of the above-described engaging portion 21 with the wing portions 22, a pair of upwardly projecting rails (protuberances) 23 and 24 are provided so as to be offset in opposite directions with respect to each other. Stoppers (third stopper members) 25 and 26 are provided outside the above-described rails 23 and 24, respectively, so as to project in the direction opposite to the offset direction of the respective adjacent one of the rails 23 and 24. The above-described engaging portions 11 and 21, the rails 13, 14, 23, and 24, and the stoppers 15, 16, 25, and 26 are all exposed above the above-described rubber member 2. It should be mentioned that the cross-sectional form of this rubber crawler belt 5, in its transverse direction, is substantially the same as that of the conventional rubber belt 1 (refer to FIG. 5).

By offsetting the rails 13 and 14 of each above-described metal core member 10 with respect to each other and offsetting the rails 23 and 24 of each metal core member 20 with respect to each other, the gap between adjacent rails 13 and 23 and the gap between adjacent rails 14 and 24 are non-symmetrically positioned, so that the noise and vibration, made by the idler wheel and the lower roller wheels when they are rotating on the above-described rails, are reduced. By engaging the stopper 25 of the metal core member 20 with a concave portion formed by the rail 13 and the stopper 15 adjacent to the stopper 25 and engaging the stopper 26 of the metal core member 20 with a concave portion formed by the rail 14 and the stopper 16 adjacent to the stopper 26, the displacement of the rubber crawler belt in its transverse direction, which occurs when a load acts thereon from the transverse direction, is prevented to some extent.

Figure 2:
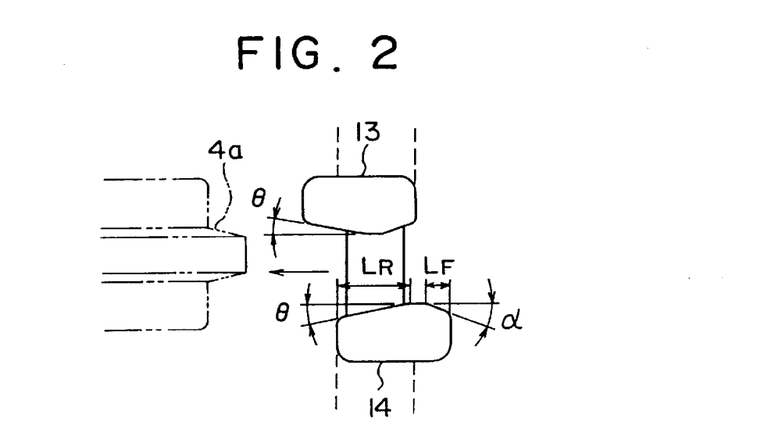
FIG. 2 is an explanatory view of the form of the rail portions of the metal core members projecting from the rubber member of FIG. 1 and the relative position of the flange portion of the idler wheel.

The form of the rails of the metal core member 10 are as shown in FIG. 2, and the rails of the metal core member 20 are the same as the rails of the metal core member 10. The opposing inner side surfaces of a pair of offset rails 13 and 14 have different guide slopes to the directions in which the rubber crawler belt 5 moves when the crawler vehicle moves rearwardly and in which the crawler vehicle moves forwardly. When the rubber crawler belt moves in a direction at the time of a reversing of the vehicle, that is when the rubber crawler belt moves backwardly, the guide slope at the entry side of the flange portion 4a of the idler wheel 4 has a slope angle θ to the longitudinal direction of the rubber crawler belt which is defined as $5° \leq \theta \geq 15°$, and is preferably in the region of 10°. The length $L_R$, in the longitudinal direction of the rubber crawler belt, of the guide slope having the above-described slope angle θ is set to be longer than the length $L_F$, in the longitudinal direction of the rubber crawler belt, of the guide slope provided at the side at which the flange portion 4a of the idler wheel enters when the vehicle moves forwardly. The guide slope to the direction in which the rubber crawler belt moves when moving forwardly can be suitable if the guide slope has such a form with a slope angle α and a length $L_F$ that simply serves as a guide for the flange portion 4a of the idler wheel.

Figure 3:
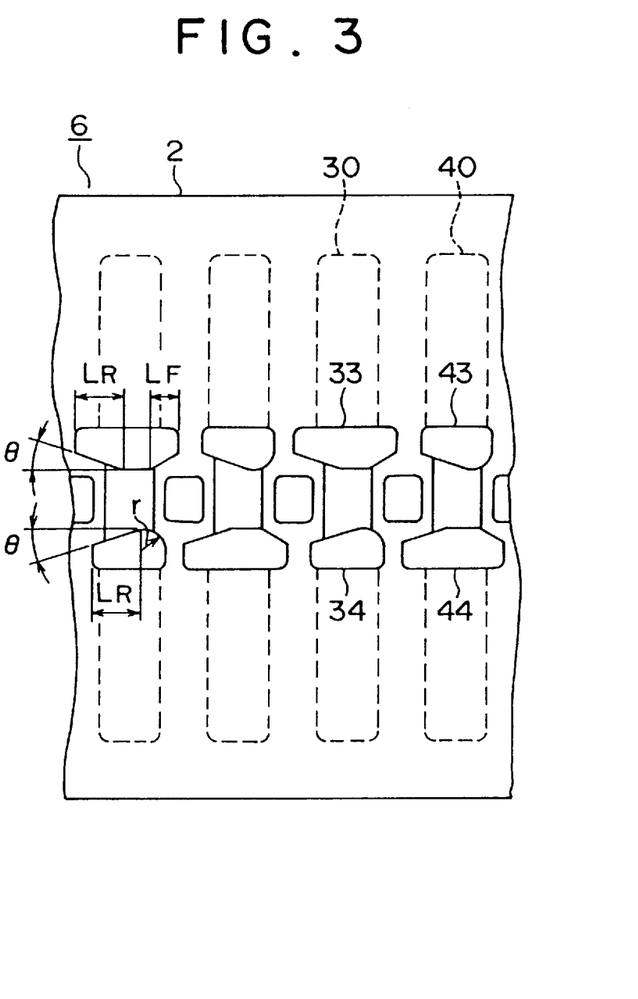
FIG. 3 is a partial plan view of a rubber crawler belt relating to the second embodiment of the present invention, seen from the interior perimeter side.

The second embodiment of the present invention will now be described. FIG. 3 shows a rubber crawler belt 6 of the second embodiment, wherein a metal core member 30, having a pair of opposing right and left rails (protuberances) 33 and 34 of different lengths, and a metal core member 40, having a pair of opposing right and left rails (protuberances) 43 and 44 of different lengths, are equidistantly and alternately buried in the rubber member 2. When the crawler vehicle reverses, the slope angle θ to the longitudinal direction of the crawler belt of either guide slope of the rails 33, 34, 43, and 44 at the side from which the flange portion 4a of the idler wheel enters is set as $5° \leq \theta \geq 15°$. The above-described length $L_R$ is longer than the length $L_F$ of the guide slope at the side from which the flange portion 4a of the idler wheel enters when the crawler vehicle moves forwardly. On the other hand, the slope angle of the guide slope at the side from which the flange portion 4a of the idler wheel enters when the crawler vehicle moves forwardly is set to be greater than the above-described slope angle θ. It should be mentioned that the rails 34 and 43, having shorter length in the longitudinal direction of the crawler belt, can have a curved surface with a radius r instead of a slope angle.

In the above, the metal core member for a rubber crawler belt, the crawler belt, and the method of winding the same are described in detail, and in particular the slope angle of the guide slope, on the inner side surface of the rail at the side the flange portion of the idler wheel enters, is made to be in the range of 5° to 15°, and the length of the guide slope at the side of this slope angle is made to be as long as possible. As a result, when the flange portion of the idler wheel abuts on the guide slope while the vehicle is reversing, the component of a force along the guide slope surface is greater than the friction force between the metal core member and the flange portion of the idler wheel. Accordingly, the flange portion of the idler wheel can slide on the guide slope and enter the portion between the rails, so that the flange portion does not run on the rail surface of the metal core member, and the vehicle can safely turn while reversing or running on a slope. The state in which the crawler belt falls off is avoided by this improvement, so that the operational efficiency is dramatically improved, and the lifetime of the rubber crawler belt can be extended.

INDUSTRIAL APPLICABILITY

The present invention, in which the flange portion of the idler wheel can avoid riding on the rail surface of the metal core member, can prevent the crawler belt from falling off, and is useful as a metal core member for a rubber crawler belt, the crawler belt, and a method of winding the same which can improve the operational efficiency and extend the lifetime of a rubber crawler belt.

We claim:

1. A metal core member suitable for use in a rubber crawler belt, said metal core member comprising:
   a first edge and a second edge spaced apart from each other and extending along a length of said metal core member;
   a left rail and a right rail separated from each other along said length of said metal core member by a wheel engaging portion of said metal core member so that said left rail has an left inner surface facing said right rail across said wheel engaging portion and said right rail has an right inner surface facing said left rail across said engaging portion;

each of said right and left rails having a height so as to form surfaces on which a flanged idler wheel can rotate while a flange of said flanged idler wheel can move between said left and right inner surfaces;

wherein at least one of said left and right rails projects beyond said first edge and at least one of said left and right rails projects beyond said second edge, with a first one of said left and right rails projecting further beyond said first edge than a second one of said left and right rails and with one of said left and right rails projecting further beyond said second edge than the other of said left and right rails;

wherein a first end portion of said left inner surface forms a first left guide slope and a first end portion of said right inner surface forms a first right guide slope for facilitating entry of said flange of said flanged idler wheel between said left and right inner surfaces when said metal core member is moving in a first direction;

wherein a second end portion of said left inner surface forms a second left guide slope and a second end portion of said right inner surface rail forms a second right guide slope for facilitating entry of said flange of said flanged idler wheel between said left and right inner surfaces when said metal core member is moving in a second direction, said second direction being opposite to said first direction;

wherein said first left guide slope has a length which is greater than a length of said second left guide slope; and wherein said first right guide slope has a length which is greater than a length of said second right guide slope.

2. A metal core member in accordance with claim 1, wherein said first left guide slope forms a first left slope angle, wherein said first right guide slope forms a first right slope angle, and wherein said first left slope angle and said first right slope angle are substantially equal to each other.

3. A metal core member in accordance with claim 1, wherein said first left guide slope forms a first left slope angle in the range of 5° to 15°, and wherein said first right guide slope forms a right slope angle in the range of 5° to 15°.

4. A metal core member in accordance with claim 1, wherein said left and right rails are offset with respect to each other by one of said left and right rails being displaced, with respect to a centerline of said metal core member along said length of said metal core member, toward said first edge and the other of said left and right rails being displaced, with respect to said centerline, toward said second edge.

5. A metal core member in accordance with claim 4, wherein said first and second rails constitute a first left stopper member and a first right stopper member, said metal core member further comprising:

a second left stopper member and a second right stopper member, said first left stopper member being located between said engaging portion and said second left stopper member, said first right stopper member being located between said engaging portion and said second right stopper member.

6. A metal core member in accordance with claim 5, wherein said first and second left stopper members are each offset from said centerline in the same direction as each other, and wherein said first and second right stopper members are each offset from said centerline in the same direction as each other.

7. A metal core member in accordance with claim 5, wherein said first and second left stopper members are offset from said centerline in opposite directions with respect to each other, and wherein said first and second right stopper members are offset from said centerline in opposite directions with respect to each other.

8. A metal core member in accordance with claim 1, wherein said second one of said left and right rails projects further beyond said second edge than said first one of said left and right rails.

9. A metal core member in accordance with claim 1, wherein said left rail and said right rail have at least substantially equal lengths.

10. A metal core member in accordance with claim 9, wherein said first left guide slope forms a first left slope angle in the range of 5° to 15°, and wherein said first right guide slope forms a first right slope angle in the range of 5° to 15°.

11. A metal core member in accordance with claim 9, wherein said first left guide slope forms a first left slope angle, wherein said first right guide slope forms a first right slope angle, and wherein said first left slope angle is at least substantially equal to said first right slope angle.

12. A metal core member in accordance with claim 9, wherein said first left guide slope forms a first left slope angle, wherein said first right guide slope forms a first right slope angle, wherein said second left guide slope forms a second left slope angle which is greater than said first left slope angle, and wherein said second right guide slope forms a second right slope angle which is greater than said first right slope angle.

13. A metal core member in accordance with claim 1, wherein said left rail and said right rail have substantially different lengths.

14. A metal core member in accordance with claim 13, wherein said first one of said left and right rails projects further beyond said second edge than said second one of said left and right rails.

15. A metal core member in accordance with claim 14, wherein said first left guide slope forms a first left slope angle, wherein said first right guide slope forms a first right slope angle, and wherein said first left slope angle and said first right slope angle are substantially equal to each other.

16. A metal core member in accordance with claim 14, wherein said first left guide slope forms a first left slope angle in the range of 5° to 15°, and wherein said first right guide slope forms a first right slope angle in the range of 5° to 15°.

17. A metal core member in accordance with claim 1, wherein said first left guide slope forms a first left slope angle, wherein said first right guide slope forms a first right slope angle, wherein said second left guide slope forms a second left slope angle which is greater than said first left slope angle, and wherein said second right guide slope forms a second right slope angle which is greater than said first right slope angle.

18. A rubber crawler belt comprising:

an endless belt having an endless interior perimeter surface;

a plurality of metal core members partially buried in said endless belt at equal intervals along a longitudinal direction of said endless interior perimeter surface of said endless belt with each metal core member having a length which extends transversely to said longitudinal direction of said endless interior perimeter of said endless belt, each said metal core member comprising:
- a forward edge and a rearward edge spaced apart from each other and extending along said length of the metal core member;
- a left rail and a right rail separated from each other along the length of the metal core member by a wheel engaging portion of the metal core member so that said left rail has a left inner surface facing said right rail across said wheel engaging portion and said right rail has a right inner surface facing said left rail across said wheel engaging portion;
- each of said right and left rails having a height extending inwardly, with respect to said endless belt, from said endless interior perimeter surface of said endless belt so that the left rails of the metal core members are in alignment with each other along said longitudinal direction to form a surface on which a flanged idler wheel can rotate, the right rails of the metal core members are in alignment with each other along said longitudinal direction to form a surface on which said flanged idler wheel can rotate, and the wheel engaging portions are in alignment with each other along said longitudinal direction to form a space through which a flange of said flanged idler wheel can rotate;
- wherein at least one of the left and right rails projects beyond the rearward edge and at least one of the left and right rails projects beyond the forward edge of the respective metal core member, with a first one of said left and right rails projecting further beyond the rearward edge than a second one of said left and right rails and with one of said left and right rails projecting further beyond the forward edge than the other of the left and right rails;
- wherein a forward portion of said left inner surface forms a left forward guide slope and a forward portion of said right inner surface forms a right forward guide slope for facilitating entry of said flange of said flanged idler wheel between said left and right inner surfaces when said rubber crawler belt is moving in a forward direction;
- wherein a rearward portion of said left inner surface forms a left rearward guide slope and a rearward portion of said right inner surface forms a right rearward guide slope for facilitating entry of said flange of said flanged idler wheel between said left and right inner surfaces when said rubber crawler belt is moving in a rearward direction;
- wherein said left rearward guide slope has a length which is greater than a length of said left forward guide slope; and
- wherein said right rearward guide slope has a length which is greater than a length of said right forward guide slope.

19. A rubber crawler belt in accordance with claim 18, wherein said left rearward guide slope forms a first left slope angle, wherein said right rearward guide slope forms a first right slope angle, and wherein said first left slope angle and said first right slope angle are substantially equal to each other.

20. A rubber crawler belt in accordance with claim 18, wherein said left rearward guide slope forms a first left slope angle in the range of 5° to 15°, and wherein said right rearward guide slope forms a first right slope angle in the range of 5° to 15°.

21. A rubber crawler belt in accordance with claim 18, wherein the left and right rails of each metal core member are offset with respect to each other by one of the left and right rails of the respective metal core member being displaced, with respect to a centerline of the respective metal core member along the length of the respective metal core member, toward the rearward edge of the respective metal core member, and the other of the left and right rails of the respective metal core member being displaced, with respect to the centerline of the respective metal core member, toward the forward edge of the respective metal core member.

22. A rubber crawler belt in accordance with claim 18, wherein the first and second rails of a respective metal core member constitute a first left stopper member and a first right stopper member; and wherein each respective metal core member further comprises:
- a second left stopper member and a second right stopper member, the first left stopper member being located between the engaging portion and the second left stopper member along the length of the respective metal core member, the first right stopper member being located between the engaging portion and the second right stopper member along the length of the respective metal core member.

23. A rubber crawler belt in accordance with claim 22, wherein the first and second left stopper members are each offset from the centerline of the respective metal core member in the same direction as each other, and wherein the first and second right stopper members are each offset from the centerline of the respective metal core member in the same direction as each other.

24. A rubber crawler belt in accordance with claim 22, wherein the first and second left stopper members are offset from the centerline of the respective metal core member in opposite directions with respect to each other, and wherein the first and second right stopper members are offset from the centerline of the respective metal core member in opposite directions with respect to each other.

25. A rubber crawler belt in accordance with claim 18, wherein said plurality of metal core members comprises a first plurality of metal core members and a second plurality of metal core members, wherein said first and second plurality of core members are positioned in said endless belt with individual metal core members of said first plurality alternating with individual metal core members of said second plurality;
- wherein the first and second rails of a respective metal core member constitute a first left stopper member and a first right stopper member;
- wherein each respective metal core member of said first plurality further comprises a second left stopper member and a second right stopper member, the first left stopper member being spaced from the second left stopper member and located between the engaging portion and the second left stopper member along the length of the respective metal core member, the first right stopper member being spaced from the second right stopper member and located between the engaging portion and the second right stopper member along the length of the respective metal core member, wherein the first and second left stopper members are each offset from the centerline of the respective metal core member in the same direction as each other, and wherein the first and second right stopper members are each offset from the centerline of the respective metal core member in the same direction as each other; and
- wherein each respective metal core member of said second plurality further comprises a third left stopper member and a third right stopper member, the first left stopper member of the respective metal core member of said second plurality being spaced from the third left stopper member and located between the engaging portion and the third left stopper member along the length of the respective metal core member so that a second left stopper member of an adjacent one of said first plurality fits between the first and third left stopper members, the first right stopper member of the respective metal core member of said second plurality being spaced from the third right stopper member and located between the engaging portion and the third right stopper member along the length of the respective metal core member so that a second right stopper member of an adjacent one of said first plurality fits between the first and third right stopper members, wherein the first and third left stopper members are offset from the centerline of the respective metal core member in opposite directions with respect to each other, and wherein the first and third right stopper members are each offset from the centerline of the respective metal core member in opposite directions with respect to each other.

26. A rubber crawler belt in accordance with claim 18, wherein the second one of said left and right rails projects further beyond the forward edge of the respective metal core member than the first one of the left and right rails.

27. A rubber crawler belt in accordance with claim 18, wherein the left rail and the right rail of each respective metal core member have at least substantially equal lengths.

28. A rubber crawler belt in accordance with claim 27, wherein the left rearward guide slope forms a left rearward slope angle in the range of 5° to 15°, and wherein the right rearward guide slope forms a right rearward slope angle in the range of 5° to 15°.

29. A rubber crawler belt in accordance with claim 27, wherein said left rearward guide slope forms a first left slope angle, wherein said right rearward guide slope forms a first right slope angle, and wherein the left rearward slope angle is at least substantially equal to the right rearward slope angle.

30. A rubber crawler belt in accordance with claim 27, wherein said left rearward guide slope forms a first left slope angle, wherein said right rearward guide slope forms a first right slope angle, wherein the left forward guide slope forms a left forward slope angle which is greater than the left rearward slope angle, and wherein the right forward guide slope forms a right forward slope angle which is greater than the right rearward slope angle.

31. A rubber crawler belt in accordance with claim 18, wherein the left rail and the right rail of a respective metal core member have substantially different lengths.

32. A rubber crawler belt in accordance with claim 31, wherein said first one of said left and right rails projects further beyond said forward edge than said second one of said left and right rails.

33. A rubber crawler belt in accordance with claim 32, wherein the left rearward guide slope forms a left rear slope angle, wherein the right rearward guide slope forms a right rear slope angle, and wherein the left rearward slope angle and the right rearward slope angle are substantially equal to each other.

34. A rubber crawler belt in accordance with claim 32, wherein the left rearward guide slope forms a left rear slope angle in the range of 5° to 15°, and wherein the right rearward guide slope forms a right rear slope angle in the range of 5° to 15°.

35. A rubber crawler belt in accordance with claim 18, wherein said left forward guide slope forms a first left slope angle, wherein said right forward guide slope forms a first right slope angle, wherein said left rearward guide slope forms a second left slope angle which is greater than said first left slope angle, and wherein said second right guide slope forms a second right slope angle which is greater than said first right slope angle.

36. A method which comprises:
   providing first and second crawler belts, each of said first and second crawler belts being in accordance with claim 28,
   winding said first rubber crawler belt onto wheels on a left side of a tracked vehicle so that said wheels on the left side enter the space above the engaging portion of each metal core member of the first rubber crawler belt from the forward edge of the respective metal core member when the tracked vehicle is moving forwardly, and said wheels on the left side enter the space above the engaging portion of each metal core member of the first rubber crawler belt from the rearward edge of the respective metal core member when the tracked vehicle is moving rearwardly, and
   winding said second rubber crawler belt onto wheels on a right side of the tracked vehicle so that said wheels on the right side enter the space above the engaging portion of each metal core member of the second rubber crawler belt from the forward edge of the respective metal core member when the tracked vehicle is moving forwardly, and said wheels on the right side enter the space above the engaging portion of each metal core member of the second rubber crawler belt from the rearward edge of the respective metal core member when the tracked vehicle is moving rearwardly.

* * * * *

UNITED STATES PATENT AND TRADEMARK OFFICE
CERTIFICATE OF CORRECTION

PATENT NO. : 5,813,733
DATED : September 29, 1998
INVENTOR(S) : Hori, et al

It is certified that error appears in the above-identified patent and that said Letters Patent is hereby corrected as shown below:

In column 14, line 27, claim 36, delete "28" and insert --18--.

Signed and Sealed this

Seventh Day of September, 1999

Attest:

Q. TODD DICKINSON

Attesting Officer

Acting Commissioner of Patents and Trademarks